No. 865,820.

PATENTED SEPT. 10, 1907.

W. J. RICHARDS.
MOTOR CONTROL SYSTEM.
APPLICATION FILED MAR. 25, 1907.

Witnesses

Inventor
Walter J. Richards
By Chas. E. Lord
Attorney

UNITED STATES PATENT OFFICE.

WALTER J. RICHARDS, OF NORWOOD, OHIO, ASSIGNOR TO ALLIS-CHALMERS COMPANY, A CORPORATION OF NEW JERSEY.

MOTOR-CONTROL SYSTEM.

No. 865,820.   Specification of Letters Patent.   Patented Sept. 10, 1907.

Application filed March 25, 1907. Serial No. 364,280.

*To all whom it may concern:*

Be it known that I, WALTER J. RICHARDS, a citizen of the United States, residing at Norwood, in the county of Hamilton and State of Ohio, have invented certain new and useful Improvements in Motor-Control Systems, of which the following is a full, clear, and exact specification.

My invention relates to motor control systems.

It has been found that one of the most effective methods of controlling the speed of an electric motor is by varying the electromotive force of the generator supplying its armature. Various systems have been devised in which this might be done.

My invention is an improvement on such systems and its object is to provide a system in which all the advantages of said prior systems are retained while in addition there are certain other advantages, such as variation in field strength of the motor to be controlled and an extreme simplicity in arrangement and operation.

With these objects in view, my invention comprises the combination of a plurality of dynamo-electric machines, separately excited field windings therefor connected in series, and means whereby a variable part of the current which traverses the field winding of one of said machines may be shunted around the field winding of another of said machines.

More specifically my invention comprises the combination of a motor, a generator supplying the armature of said motor, separately excited field windings for said generator and said motor said field windings being connected in series with each other, a dynamo-electric machine the armature of which is connected in shunt to the generator field winding, and means for varying the field strength of said dynamo-electric machine and for reversing the connections of the generator field winding.

Other features of my invention will appear from the description and drawing and will be particularly pointed out in the claims.

Figure 1:
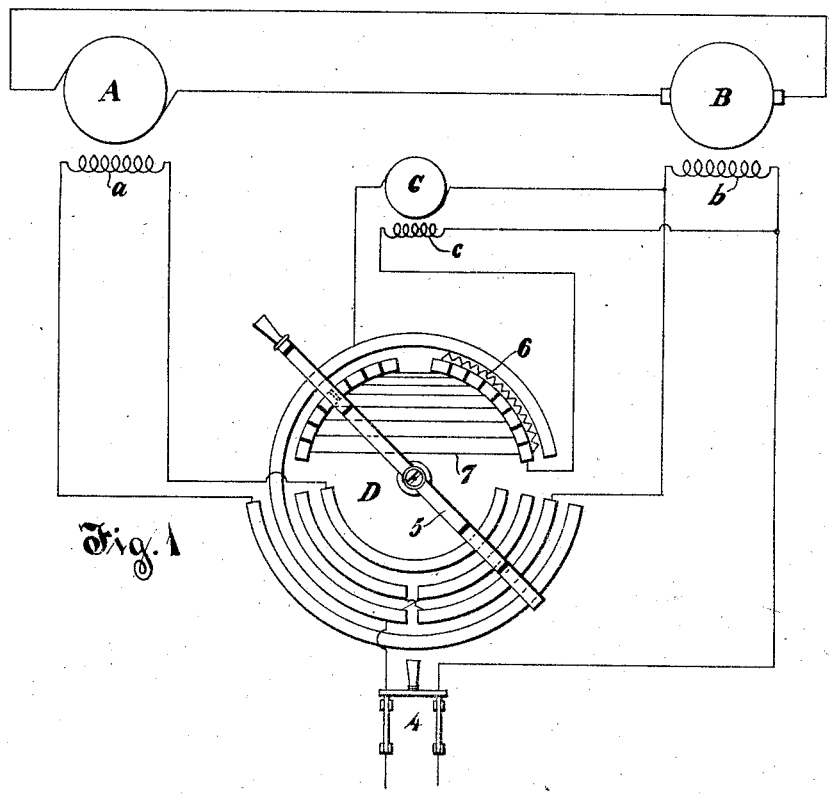
Figure 2:
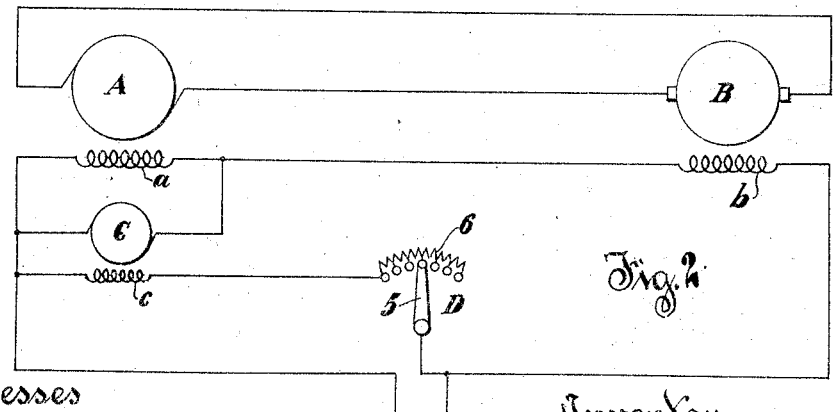

Figure 1 shows diagrammatically one embodiment of my invention; and Fig. 2 is a simple connection diagram illustrating the principle of my invention.

The armature A of a generator supplies the armature B of a motor. The generator may be driven from any desired source and the motor may be used to do any desired work, such, for instance, as operating rolling mills or hoisting machinery. The field windings $a$ and $b$ of the generator and motor respectively are connected in series with each other and supplied with current from any desired source through a switch 4. The armature C of an auxiliary dynamo-electric machine, driven from any desired source, is connected across the field winding $a$. The movable arm 5 of a controller D, as it passes through its vertical position, reverses the connections of the field winding $a$. The arm 5 also varies the amount of the resistance 6 in circuit with the field winding $c$ of the auxiliary generator, thus varying the electromotive force of said generator. The resistance 6 is provided with two sets of contacts connected by cross connections 7, so that said resistance is cut out of circuit as arm 5 is moved in either direction from the vertical.

With the switch 4 closed and the arm 5 in its vertical or "off" position, the field winding $a$ and the armature C are preferably short-circuited and the field winding $b$ supplied with the full potential of the auxiliary source of supply. However, as the circuit of the field winding $c$ is incomplete the armature C generates no electromotive force and its being short-circuited does no damage. As the arm 5 is moved in either direction from the vertical it first breaks the short-circuit around the field winding $a$ and armature C to connect said field winding and said armature in shunt to each other and in series with the field winding $b$. As the armature C has a very low and almost inappreciable resistance as compared to the field winding $a$, it carries nearly all of the current which is supplied to the field winding $b$ leaving very little to flow in the field winding $a$. The generator A now generates a very small electromotive force which it impresses on the motor armature B. The arm 5 next completes the circuit of the field winding $c$ through the entire resistance 6, thus causing the auxiliary generator to generate a small electromotive force. The generator C is so connected that this electromotive force is in the opposite direction to the electromotive force impressed on its armature so that the armature C offers increased opposition to the flow of current through it and thus throws more current through the generator field winding $a$. This increases the electromotive force of the generator armature A so that it impresses a higher electromotive force on the motor armature B. As the arm 5 is moved farther from the vertical toward the horizontal the resistance 6 is gradually cut out of circuit, thus increasing the strength of the field winding $c$ and the counter electromotive force of the armature C to throw more and more current through the field winding $a$. This gradually increases the field strength and therefore the electromotive force of the generator and impresses a gradually increasing electromotive force on the motor armature B. The latter starts as soon as the electromotive force impressed thereon is sufficient and increases in speed with further increases in its impressed electromotive force. The increase in the counter electromotive force of the armature C, besides increasing the voltage across the field winding $a$, decreases the voltage across the field winding $b$, thus weakening the motor field to assist in increasing the motor speed.

As the arm 5 is moved backward from the horizontal toward the vertical the reverse of the cycle of operations above described takes place, and the motor B is allowed to slow down. The operation is the same for movement of the arm 5 on either side of its vertical position, the only difference being that the direction of the current in the field winding a is reversed, thus reversing the direction of current in the armatures A and B and the direction of rotation of the motor. In Fig. 2 the reversing switch for the field winding a is omitted for the sake of simplicity and the arm 5 is shown as merely varying the amount of the resistance 6 in circuit with the field winding c.

Many modifications in the precise arrangement here shown and described may be made without departing from the spirit and scope of my invention, and all such I aim to cover in the following claims.

What I claim as new is:—

1. In combination, a plurality of dynamo electric machines, separately excited field windings therefor connected in series, and means whereby a variable part of the current which traverses the field winding of one of said machines may be shunted around the field winding of another of said machines.

2. In combination, a plurality of dynamo-electric machines, separately excited field windings therefor connected in series, means whereby a variable part of the current which traverses the field winding of one of said machines may be shunted around the field winding of another of said machines, and means for reversing the connections of the field winding of one of said machines.

3. In combination, a plurality of dynamo-electric machines, separately excited field windings therefor connected in series, means whereby a variable part of the current which traverses the field winding of one of said machines may be shunted around the field winding of another of said machines, and means for reversing the connections of the shunted field winding.

4. In combination, a plurality of dynamo-electric machines, separately excited field windings therefor connected in series, and a source of electromotive force in shunt to one of said field windings.

5. In combination, a plurality of dynamo-electric machines, separately excited field windings therefor connected in series, a source of electromotive force in shunt to one of said field windings, and means for varying the electromotive force of said source.

6. In combination, a plurality of dynamo-electric machines, separately excited field windings therefor connected in series, and an auxiliary dynamo-electric machine the armature of which is connected across one of said field windings.

7. In combination, a plurality of dynamo-electric machines, separately excited field windings therefor connected in series, an auxiliary dynamo-electric machine the armature of which is connected across one of said field windings, and means for varying the electromotive force of said auxiliary dynamo-electric machine.

8. In combination, a plurality of dynamo-electric machines, separately excited field windings therefor connected in series, an auxiliary dynamo-electric machine the armature of which is connected across one of said field windings, and means for varying the electromotive force of said auxiliary dynamo-electric machine and for reversing the connections of one of said field windings.

9. In combination, a plurality of dynamo-electric machines, separately excited field windings therefor connected in series, an auxiliary dynamo-electric machine the armature of which is connected across one of said field windings, and means for varying the electromotive force of said auxiliary dynamo-electric machine and for reversing the connections of the field winding across which the auxiliary dynamo-electric machine is connected.

10. A motor control system, comprising a motor, a generator supplying the armature thereof, separately excited field windings for said generator and said motor connected in series with each other, and means for shunting one of said field windings.

11. A motor control system, comprising a motor, a generator supplying the armature thereof, separately excited field windings for said generator and said motor connected in series with each other, and means for variably shunting one of said field windings.

12. A motor control system, comprising a motor, a generator supplying the armature thereof, separately excited field windings for said generator and said motor connected in series with each other, and means for shunting one of said field windings and for reversing the connections of one of said field windings.

13. A motor control system, comprising a motor, a generator supplying the armature thereof, separately excited field windings for said generator and said motor connected in series with each other, and means for shunting one of said field windings and for reversing the connections of the shunted field winding.

14. A motor control system, comprising a motor, a generator supplying the armature of said motor, separately excited field windings for said generator and said motor connected in series with each other, and a source of electromotive force connected across one of said field windings.

15. A motor control system, comprising a motor, a generator supplying the armature of said motor, separately excited field windings for said generator and said motor connected in series with each other, an auxiliary dynamo-electric machine the armature of which is connected in shunt to one of said field windings, and means for varying the electromotive force of said auxiliary machine.

16. A motor control system, comprising a motor, a generator supplying the armature of said motor, separately excited field windings for said generator and said motor connected in series with each other, an auxiliary dynamo-electric machine connected across one of said field windings, and means for reversing the connections of one of said field windings.

17. A motor control system, comprising a motor, a generator supplying the armature of said motor, separately excited field windings for said generator and said motor connected in series with each other, a source of electromotive force connected in shunt to one of said field windings, and means for reversing the connections of said shunted field winding.

18. A motor control system, comprising a motor, a generator supplying the armature of said motor, separately excited field windings for said generator and said motor connected in series with each other, a source of electromotive force connected across one of said field windings, and means for varying the electromotive force of said source and for reversing the connections of one of said field windings.

19. A motor control system, comprising a motor, a generator supplying the armature of said motor, separately excited field windings for said generator and said motor connected in series with each other, an auxiliary dynamo-electric machine connected in shunt to one of said field windings, and means for varying the electromotive force of said auxiliary machine and for reversing the connections of said shunted field winding.

20. A motor control system, comprising a motor, a generator supplying the armature of said motor, field windings for said generator and said motor connected in series with each other, and an auxiliary dynamo-electric machine the armature of which is connected in shunt to one of said field windings.

21. A motor control system, comprising a motor, a generator supplying the armature of said motor, field windings for said generator and said motor connected in series with each other, an auxiliary dynamo-electric machine connected across one of said field windings, and means for varying the electromotive force of said auxiliary machine.

22. A motor control system, comprising a motor, a generator supplying the armature of said motor, field windings for said generator and said motor connected in series with each other, a source of electromotive force connected in shunt to one of said field windings, and means for reversing the connections of one of said field windings.

23. A motor control system, comprising a motor, a generator supplying the armature of said motor, field windings for said generator and said motor connected in series with each other, a source of electromotive force connected across one of said field windings, and means for reversing the connections of that field winding across which said source of electromotive force is connected.

24. A motor control system, comprising a motor, a generator supplying the armature of said motor, field windings for said generator and said motor connected in series with each other, an auxiliary dynamo-electric machine connected in shunt to one of said field windings, and means for varying the electromotive force of said auxiliary machine and for reversing the connections of one of said field windings.

25. A motor control system, comprising a motor, a generator supplying the armature of said motor, field windings for said generator and said motor connected in series with each other, an auxiliary dynamo-electric machine the armature of which is connected across one of said field windings, and means for varying the electromotive force of said auxiliary machine and for reversing the connections of that field winding across which said armature is connected.

26. A motor control system, comprising a motor, a generator supplying the armature of said motor, separately excited field windings for said generator and said motor connected in series with each other, and an auxiliary dynamo-electric machine connected across the field winding of the generator.

27. A motor control system, comprising a motor, a generator supplying the armature of said motor, separately excited field windings for said generator and said motor connected in series with each other, a source of electromotive force connected in shunt to the field winding of the generator, and means for varying the electromotive force of said source.

28. A motor control system, comprising a motor, a generator supplying the armature of said motor, separately excited field windings for said generator and said motor connected in series with each other, a source of electromotive force connected across the field winding of the generator, and means for reversing the connections of field winding of one of said machines.

29. A motor control system, comprising a motor, a generator supplying the armature of said motor, separately excited field windings for said generator and said motor connected in series with each other, an auxiliary dynamo-electric machine connected in shunt to the field winding of the generator, and means for reversing the connections of the generator field winding.

30. A motor control system, comprising a main motor, a main generator supplying the armature of said motor, separately excited field windings for said generator and said motor connected in series with each other, an auxiliary dynamo-electric machine the armature of which is connected across the field winding of said main generator, and means for varying the electromotive force of said auxiliary machine and for reversing the connections of the field winding of one of said main machines.

31. A motor control system, comprising a motor, a generator supplying the armature of said motor, separately excited field windings for said generator and said motor connected in series with each other, a source of electromotive force connected in shunt to the field winding of the generator, and means for varying the electromotive force of said source and for reversing the connections of the generator field winding.

32. A motor control system, comprising a motor, a generator supplying the armature of said motor, field windings for said generator and said motor connected in series with each other, and a source of electromotive force connected in shunt to the field winding of the generator.

33. A motor control system, comprising a motor, a generator supplying the armature of said motor, field windings for said generator and said motor connected in series with each other, a source of electromotive force connected across the field winding of the generator, and means for varying the electromotive force of said source.

34. A motor control system, comprising a main motor, a main generator supplying the armature of said motor, field windings of said generator and said motor connected in series with each other, an auxiliary dynamo-electric machine the armature of which is connected in shunt to the field winding of said main generator, and means for reversing the connections of the field winding of one of said main machines.

35. A motor control system, comprising a motor, a generator supplying the armature of said motor, field windings for said generator and said motor connected in series with each other, an auxiliary dynamo-electric machine the armature of which is connected across the field winding of the generator, and means for reversing the connections of the generator field winding.

36. A motor control system, comprising a motor, a generator supplying the armature of said motor, field windings for said generator and said motor connected in series with each other, a source of electromotive force connected in shunt to the field winding of the generator, and means for varying the electromotive force of said source and for reversing the connections of the field winding of one of said machines.

37. A motor control system, comprising a motor, a generator supplying the armature of said motor, field windings for said generator and said motor connected in series with each other, a source of electromotive force connected across the field winding of the generator, and means for varying the electromotive force of said source and for reversing the connections of the generator field winding.

38. In combination, a plurality of dynamo-electric machines, separately excited field windings for said machines connected in series, a shunt around one of said field windings, and a source of variable electromotive force for varying the relative amounts of current through said shunt and the shunted field winding.

39. A system of motor control, comprising a motor, a generator, supplying the armature thereof, separately excited field windings for said motor and said generator connected in series with each other, a shunt around the field winding of one of said machines, and a source of variable electromotive force for varying the relative amounts of current through said shunt and the shunted field winding.

40. A system of motor control, comprising a motor, a generator supplying the armature thereof, separately excited field windings for said motor and said generator connected in series with each other, a shunt around the field winding of the generator, and a source of variable electromotive force for varying the relative amounts of current through said shunt and the generator field winding.

41. In combination, a plurality of dynamo-electric machines, field windings for said machines connected in series, a shunt around one of said field windings, and a source of variable electromotive force for varying the relative amounts of current through said shunt and the shunted field winding.

42. A system of motor control, comprising a motor, a generator supplying the armature thereof, field windings for said motor and said generator connected in series with each other, a shunt around the field winding of one of said machines, and a source of variable electromotive force for varying the relative amounts of current through said shunt and the shunted field winding.

43. A system of motor control, comprising a motor, a generator supplying the armature thereof, field windings for said motor and said generator connected in series with each other, a shunt around the field winding of the generator, and a source of variable electromotive force for varying the relative amounts of current through said shunt and the generator field winding.

In testimony whereof I affix my signature, in the presence of two witnesses.

WALTER J. RICHARDS.

Witnesses:
GEO. B. SCHLEY,
FRED J. KINSEY.